F. S. KOCH.
STREET SWEEPER.
APPLICATION FILED JUNE 9, 1915.
1,178,240.
Patented Apr. 4, 1916.
4 SHEETS—SHEET 4.
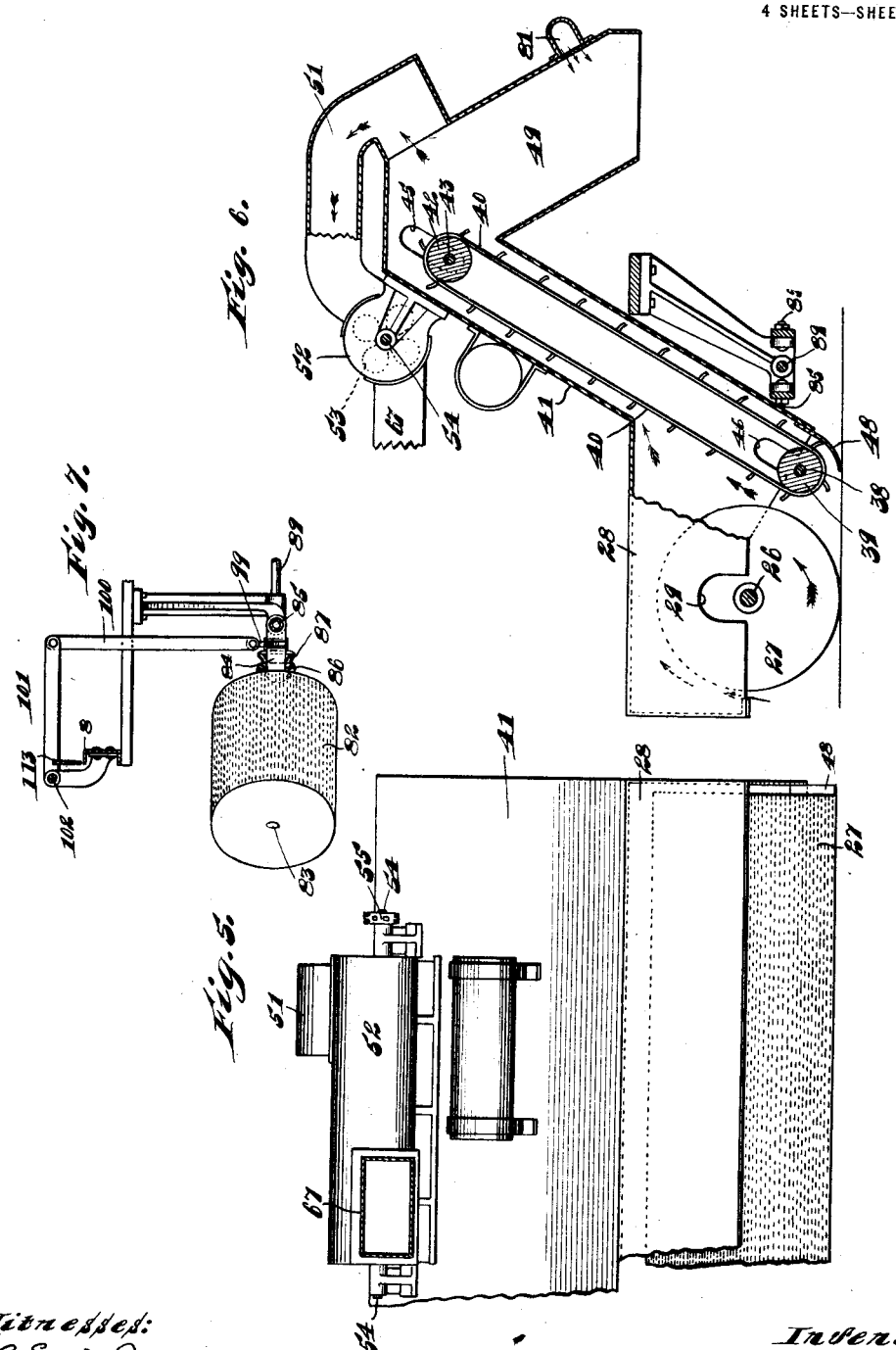
Witnesses:
C. E. Wessels
B. Y. Richards
Inventor:
Frank S. Koch,
By Joshua R. H. Potts
his Attorney.

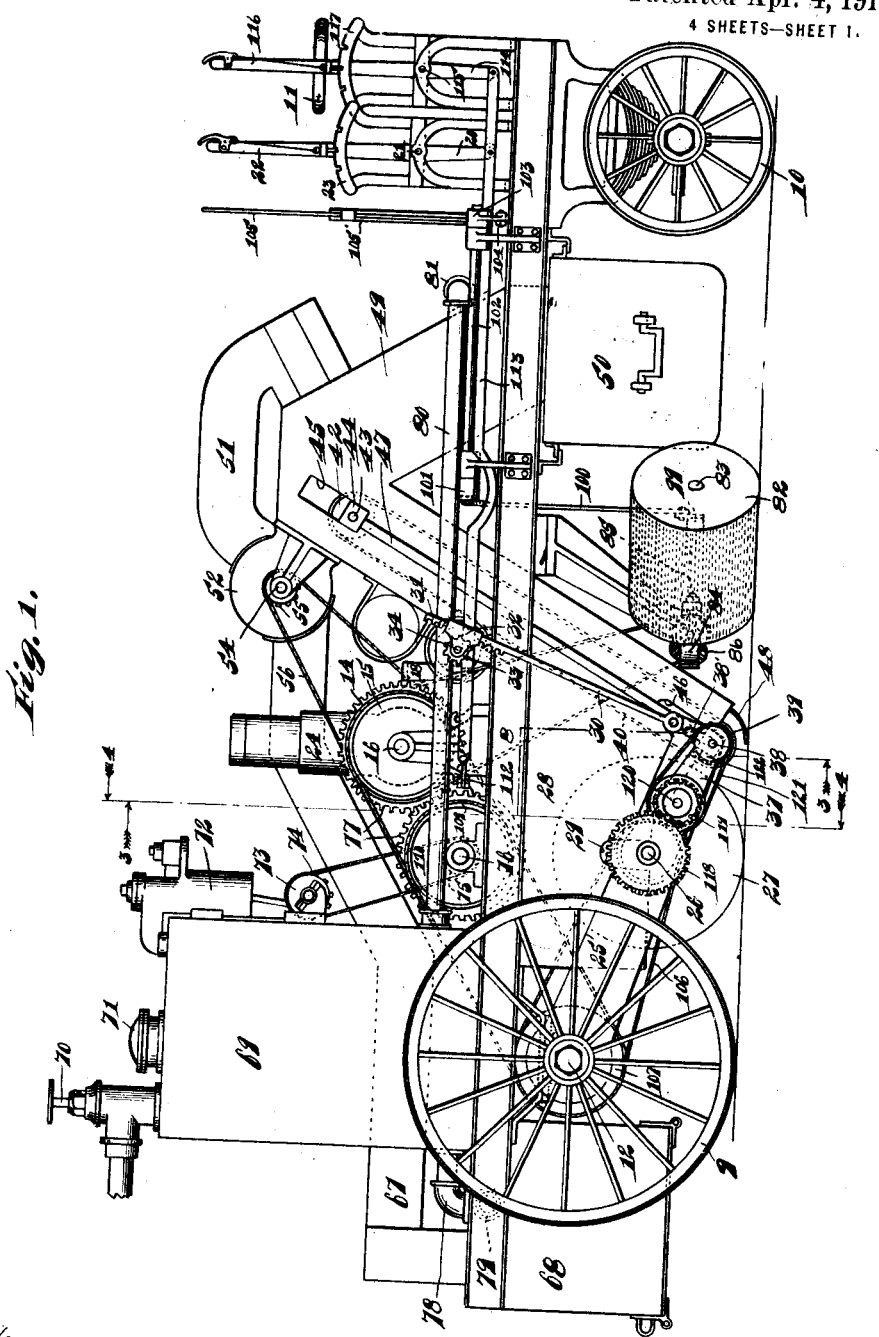

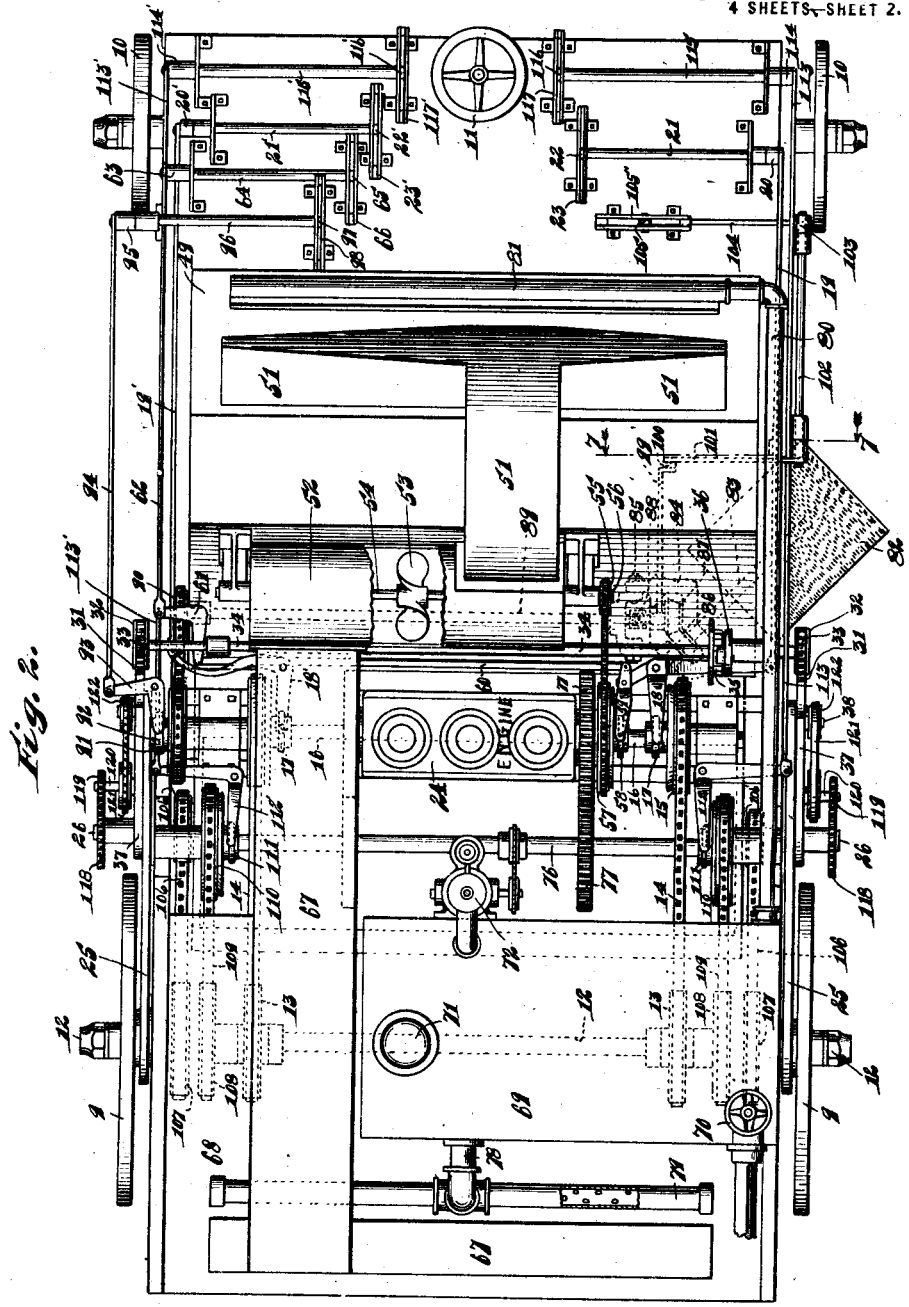

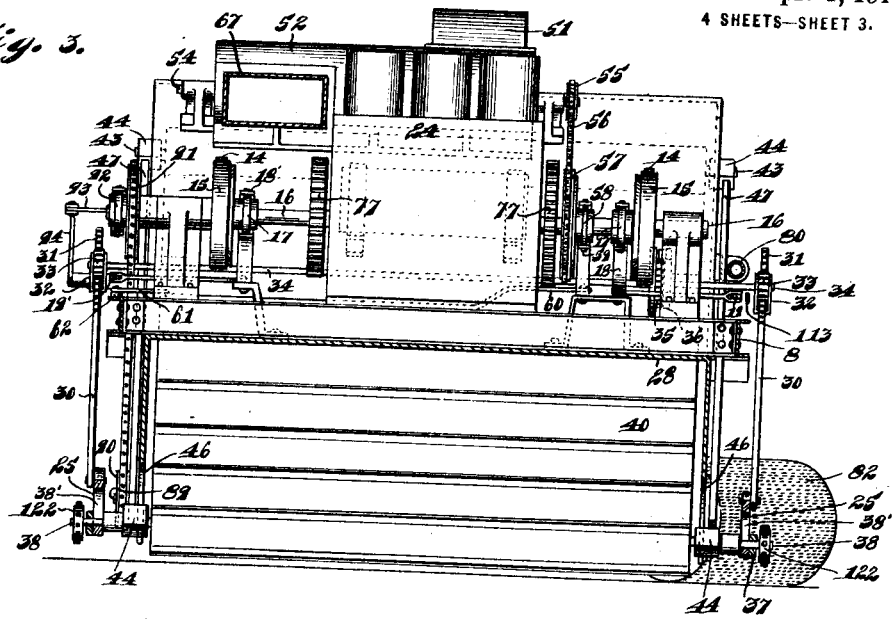

UNITED STATES PATENT OFFICE.

FRANK S. KOCH, OF CHICAGO, ILLINOIS.

STREET-SWEEPER.

1,178,240.  Specification of Letters Patent.  Patented Apr. 4, 1916.

Original application filed November 17, 1910, Serial No. 592,816. Divided and this application filed June 9, 1915. Serial No. 33,046.

*To all whom it may concern:*

Be it known that I, FRANK S. KOCH, a citizen of the United States, and a resident of the city of Chicago, county of Cook, and State of Illinois, have invented certain new and useful Improvements in Street-Sweepers, of which the following is a specification.

My invention relates to street sweeping machines and has for its object the provision of an improved construction of this character, the present application being in effect, a division of my prior application, Serial No. 592,816, filed November 17, 1910.

The invention consists in the combinations and arrangements of parts hereinafter described and claimed.

The invention will be best understood by reference to the accompanying drawings forming a part of this specification, and in which, Figure 1 is a side view of a machine embodying my invention, Fig. 2, a top plan view of the same, with portions broken away, Fig. 3, a section taken on line 3—3 of Fig. 1, Fig. 4, a section taken on line 4—4 of Fig. 1, Fig. 5, a partial vertical transverse section of the machine illustrating a blower housing and brush housing employed therein, Fig. 6, a detail view of a dust conveyer employed in the machine, and Fig. 7, a section taken on substantially line 7—7 of Fig. 2.

The preferred form of construction, as illustrated in the drawings, comprises a suitable frame or platform 8 mounted to travel upon rear wheels 9 and front wheels 10, the front wheels 10 being provided with a steering wheel 11 of any usual or desired construction. The rear wheels 9 are fixed to a transverse shaft or axle 12 driven by means of a pair of sprockets 13 connected by chains 14 with sprockets 15 loosely mounted on engine shaft 16. Clutch members 17 are also arranged on shaft 16 adjacent sprockets 15 and are operatively connected with bell cranks 18 and 18' for operating the same. The bell cranks 18 and 18' are connected respectively by means of links 19 and 19' with arms 20 and 20' fixed to operating shafts 21 and 21' arranged at the forward end of the frame 8 in convenient proximity to steering wheel 11. Each of the shafts 21 and 21' is equipped with an operating arm 22—22' coöperating with corresponding quadrants 23—23' by means of which the clutches 17 may be thrown into and out of operative relation with the sprockets 15, as will be readily understood, to effect driving of the machine. The engine shaft 16 is driven by an ordinary gasolene engine 24, as will be readily understood.

A pair of vertically swinging arms 25 is pivotally mounted on shaft 12 and a transverse shaft 26 is mounted in said arms. A rotating sweeping brush 27 is secured on shaft 26 and extends transversely substantially the full width of frame 8. Sweeping brush 27 is inclosed in a housing 28 provided with notches 29 in its ends to permit upward swinging of brush 27, as will be readily understood. The free ends of arms 25 are pivotally connected with links 30 having rack bars 31 adjacent their upper ends sliding in guides 32 and meshing with pinions 33 on the opposite ends of a transverse shaft 34. Shaft 34 is equipped with a ratchet wheel 35 and a pawl arm 36 by means of which said shaft may be operated to effect adjustments of the free ends of arms 25 and thus of the brush 27 with respect to the street or other surface upon which the wheels 9 and 10 rest.

A second pair of vertically swinging arms 37 is mounted pivotally on shaft 26 and a shaft 38 is mounted in the free ends of the arms 37. Shaft 38 carries a conveyer drum 39 and a traveling conveyer 40 travels over said drum. Conveyer 40 is inclosed in an upwardly and forwardly extending housing 41 communicating at its lower end with housing 28 and another conveyer drum 42 is mounted at the upper end of housing 41 upon a shaft 43 extending transversely thereof and mounted at its ends in blocks 44 sliding in slots 45 in the sides of said housing. At its lower end, housing 41 is provided in its sides with notches or slots 46 to permit of vertical adjustments of shaft 38, each of the arms 25 being provided with a slot 38' to permit of the free passage of shaft 38 and vertical adjustments thereof. The shaft 38 is connected at each end with the corresponding block 44 by means of a bar 47 thus keeping the conveyer 40 taut during vertical adjustments of the conveyer. By this arrangement, it will be observed that the conveyer is free to rise independently of the brush 27 so as to readily pass over obstructions and that the conveyer belt 40 will always remain taut during such passage.

A flexible apron 48 of canvas or other suitable material is arranged at the bottom of housing 41 in operative relation with brush 27 and conveyer belt 40 so that dust and dirt swept up by the brush 27 will be conveyed upwardly by the conveyer belt 40, as will be readily understood.

A downwardly and forwardly inclined discharge chute 49 is connected with the upper end of housing 41 and leads to a dust-box 50, as shown. An air chute or flue 51 is connected with the upper forward portion of chute 49 and leads to a blower housing 52 inclosing a blower fan 53 mounted upon an operating shaft 54 in said housing. Shaft 54 is driven through the medium of a sprocket 55, chain 56 and another sprocket 57 on shaft 16, said blower shaft being thrown into and out of operation by means of a clutch 58 on shaft 16 operated by a lever 59 connected by means of a link 60 with a bell crank 61. Bell crank 61 is connected by means of a link 62 with an arm 63 on an operating shaft 64 provided with an operating handle 65 coöperating with a quadrant 66 adjacent the steering wheel 11. By this arrangement, it will be observed, that blower shaft 53 may be readily thrown into and out of operation. When in operation, the blower induces a suction upwardly through housings 28 and 41 and flue 51, so that the dissemination of dust is prevented and the lighter particles such as paper and fine dust are drawn upwardly through flue 51 while the heavier particles fall through chute 49 into the box 50.

Another flue 67 leads from blower housing 52 into the top of another dust box 68 arranged at the rear frame 8. A water tank 69 is arranged on the rear of frame 8, and is provided with an inlet valve 70 for filling the same with water and an inlet cover 71 by means of which disinfectant may be supplied to said tank and inspections of the interior made. An air pump 72 communicates with the top of tank 69 and serves to introduce pressure thereinto, said air pump being driven by means of a sprocket 73, chain 74 and sprocket 75 on shaft 76 driven from shaft 16 by means of gears 77. A pipe 78 leads from the lower rear portion of tank 69 to a sprinkler pipe 79 arranged in the upper portion of box 68, and a corresponding pipe 80 leads forwardly from tank 69 to a sprinkler 81 arranged in the forward lower portion of chute 49, as indicated. By this arrangement, it will be observed that the dust deposited in boxes 50 and 68 may be sprinkled and disinfected, as desired.

An angularly positioned brush 82 is mounted upon a shaft 83 to project angularly from one side of frame 8 to serve as a means for sweeping a gutter and is positioned to force its sweepings outwardly into the path of brush 27 to be picked up thereby as will be readily understood. Shaft 83 is mounted in a bracket 84 pivoted to swing upwardly at 85, said shaft carrying a bevel gear 86 engaging with a bevel gear 87 having a universal joint connection 88 with an operating shaft 89. Shaft 89 is driven by means of a sprocket chain 90 from a sprocket 91 on shaft 16, said sprocket 91 being controlled by a clutch member 92 on said shaft. Clutch member 92 is operatively connected with a bell crank 93 in turn connected by a link 94 with an operating arm 95 on an operating shaft 96 provided with an operating arm 97 coöperating with a suitable quadrant 98 adjacent the steering wheel 11. Bracket 84 is provided with a forwardly extending arm 99 connected by a link 100 with an arm 101 on an oscillatory shaft 102 arranged at the side of frame 8. Shaft 102 is provided with a depending arm 103 connected by means of a link 104 with the lower end of an operating arm 105 coöperating with a quadrant 105', and by means of which brush 82 may be readily swung upwardly out of operative position.

The brush shaft 26 is driven by means of sprocket chains 106 engaging sprockets 106' on shaft 26 and sprockets 107 loosely mounted on shaft 12 and secured to similar sprockets 108 connected by chains 109 with sprockets 110 on shaft 76. Each of the sprockets 110 coöperates with a clutch member 111, said members being operated by bell cranks 112 and 112' positioned on opposite sides of frame 8. Bell cranks 112—112' are connected respectively by means of links 113—113' with arms 114—114' on shafts 115—115', said shafts being provided with operating arms 116—116' coöperating with quadrants 117—117' adjacent the steering wheel 11. By this arrangement, it will be observed that the brush 27 may be readily thrown into and out of operation by the operator whatever the vertical position of said brush.

The conveyer belt 40 is operated through the medium of gears 118 fixed on the opposite ends of shaft 26 and meshing with gears 119 on corresponding stud shafts 120 on the corresponding arms 37. Shafts 120 are connected by means of sprocket chains 121 with sprockets 122 on the opposite ends of shaft 38, so that when brush shaft 26 is operated, conveyer 48 will also be operated to carry away the sweepings.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A street sweeping machine comprising a main frame; a driving shaft on said frame; a pivotally mounted brush frame carrying a second shaft having a universal joint connection with said driving shaft; a brush on said brush frame operatively connected with said second shaft; and means for adjusting said brush frame, substantially as described.

2. A street sweeping machine comprising a frame; a main shaft on said frame; a driving shaft on said frame; a pivotally mounted brush frame carrying a second shaft having a universal joint connection with said driving shaft; a brush shaft on said brush frame having a bevel gear connection with said second shaft; a brush on said brush shaft; and means for adjusting said brush frame, substantially as described.

3. A street sweeping machine comprising a frame; a vertically adjustable support on said frame; a rotary brush on said support; a second support vertically adjustable on said first mentioned support; and a conveyer mounted on said second support adjacent to and coöperating with said brush, substantially as described.

4. A street sweeping machine comprising a frame; a vertically swinging support on said frame; a rotary brush on said support; a second support pivoted for vertical swinging on said first mentioned support; and a conveyer mounted on said second mentioned support adjacent to and coöperating with said brush, substantially as described.

5. A street sweeping machine comprising a wheeled frame; a pair of vertically swinging arms in said frame; a rotating sweeping brush in said arms; a second pair of arms pivotally mounted on said first mentioned arms; and a conveyer mounted on said second pair of arms adjacent to and coöperating with said sweeping brush, substantially as described.

6. A street sweeping machine comprising a wheeled frame; a pair of vertically swinging arms in said frame; a brush shaft mounted in said arms; a rotatable sweeping brush on said brush shaft; driving means mounted concentrically with the axis of said swinging arms and operatively connected with said brush; a second pair of arms pivotally mounted on said brush shaft; and a conveyer roller mounted on the free end of said second pair of arms adjacent to and coöperating with said brush, substantially as described.

7. A street sweeping machine comprising a wheeled frame; a pair of vertically swinging arms in said frame; a brush shaft mounted in said arms; a rotatable sweeping brush on said brush shaft; driving means mounted concentrically with the axis of said swinging arms and operatively connected with said brush; a second pair of arms pivotally mounted on said brush shaft; a conveyer roller mounted on the free end of said second pair of arms adjacent to and coöperating with said brush; a housing surrounding said brush and said conveyer; and means for drawing air through said housing, substantially as described.

8. A street sweeping machine comprising a wheeled frame; a pair of arms mounted on said frame to swing vertically from the axis of the rear wheels thereof; a brush shaft on said arms; a rotatable sweeping brush on said brush shaft; driving means mounted concentrically with the axis of the rear wheels of said frame and operatively connected with said brush shaft; a second pair of arms pivotally mounted on said brush shaft; a conveyer roller mounted on the free end of said second pair of arms arranged adjacent to and coöperating with said brush; a housing surrounding said brush and said conveyer; a rack bar and pinion connection with said second pair of arms for adjusting the same; and means for drawing air through said housing, substantially as described.

In testimony whereof I have signed my name to this specification in the presence of two subscribing witnesses.

FRANK S. KOCH.

Witnesses:
   Joshua R. H. Potts,
   B. G. Richards.